United States Patent Office 3,772,414
Patented Nov. 13, 1973

3,772,414
PREPARATION OF ESTERS OF
PHOSPHORUS ACIDS
Joseph W. Baker and Ignatius Schumacher, St. Louis, Mo., assignors to Monsanto Company, St. Louis, Mo.
No Drawing. Continuation-in-part of abandoned application Ser. No. 104,171, Jan. 5, 1971. This application June 24, 1971, Ser. No. 156,562
Int. Cl. C07f 9/08, 9/16
U.S. Cl. 260—973                                    16 Claims

ABSTRACT OF THE DISCLOSURE

Esters of phosphorus acids are prepared by an improved process whereby thiol- or hydroxyl-containing organic materials and phosphorus halides are reacted at specified temperatures in the presence of urea catalysts thereby providing high yields of substantially pure esters and allowing preparation of selected mono-, di- and tri-esters of phosphorus acids having substantially no side reactant contaminations. By means of this improved process, mono-, di- and tri-esters of phosphorus acids may be selectively prepared. They are useful as plasticizers and processing aids, and as intermediates in the preparation of plasticizers, oil additives and functional fluids.

CROSS-REFERENCES TO RELATED APPLICATIONS

This application is a continuation-in-part of copending application Ser. No. 104,171, filed Jan. 5, 1971 and now abandoned.

BACKGROUND OF THE INVENTION

This invention relates to a novel process for the preparation of organophosphorus acid esters. More particularly, this invention is concerned with a process comprising a urea catalyzed reaction of halides of phosphorus and thiol- or hydroxyl-containing organic materials.

Numerous methods have been long known for preparing organophosphorus esters. One of those methods involves the reaction of a phosphoryl halide and a monohydric organic compound without the use of a catalyst. Such a process is not commercially practical because of the need for lengthy reaction times and the resultant low yields. Another disadvantage of processes of that type is the need for the use of excessive amounts of the monohydric organic compound.

Another known method comprises the addition of certain amines to the aforedescribed reaction mixture to effect higher yields. The cost of the amines and the cost of recovering them for use in the process renders the method impractical for commercial operation.

In still other methods, the reaction is catalyzed, so as to produce greater yields, by adding a metal to the reaction mixture, such as copper powder, iron filings, calcium, aluminum or magnesium; or a halide such as aluminum chloride, magnesium chloride or boron trifluoride; or a sulfate such as copper sulfate; or an oxide such as magnesium oxide or copper oxide.

The employment of such catalysts has several attendant inherent disadvantages, among which are low conversion of the starting materials and lengthy reaction times required for completion of the reaction. As described in U.S. Pats. 2,610,978 and 2,632,018, an insoluble complex forms during the reaction when aluminum chloride is used as a catalyst.

When alcohols are reacted with a phosphoryl halide, either without a catalyst or in the presence of any of the above-mentioned catalysts, other than magnesium chloride, undersirable by-products are formed. The by-products contribute difficult distillation problems, lower yields of the desired product and lower reaction efficiency. A method described in U.S. Pat. 2,410,118 is illustrative of the typical distillation problems encountered. In that method, distillation is difficult due to the high concentration of salts of various phosphorus acids in the distillation still.

U.S. Pat. 2,868,827 describes the use of titanium tetrachloride as a catalyst for producing organophosphate esters. Disadvantages encountered employing titanium tetrachloride reside in the excessive and lengthy times necessary to obtain desirable yields and the relatively large amounts of the metal halide catalysts required. Further, when the reaction is conducted in the presence of a titanium halide catalyst, recovery of the desired reaction product is a problem. At the completion of the reaction, it has been found necessary to wash the reaction mixture with a citrate or tartrate solution which forms a complex with the titanium catalyst. The complex is then removed by washing with water followed by drying the remaining product.

Another disadvantage encountered with the employment of many of the aforedescribed catalysts is the need for complicated material-handling procedures for the catalyst.

Additionally, preparation of organophosphorus esters by the aforedescribed catalyzed reactions restricts the manufacturer in that only one specific type of organophosphorus ester of high purity could be prepared by the reaction. Thus, one could not prepare compounds of high purity such as, for example, cresyl diphenyl phosphate, bromophenyl diphenyl phosphate, phenyl bis(chlorophenyl) phosphate, cresyl phenyl phosphorochloridate and the like. By the aforedescribed procedures, only relatively impure triorganophosphorus ester or esters containing the same aryl groups could be prepared, for example, triphenyl phosphate, tricresyl phosphate and the like. Thus, in the preparation of triorganophosphorus esters by the aforedescribed procedures, the specific triorganophosphorus esters prepared were contaminated by side reactants which could only be removed by lengthy and difficult washing and distillation procedures.

Accordingly, the objective of this invention is to provide a novel and improved catalytic process for the preparation of organophosphorus esters in which the disadvantages of the prior art are eliminated and selective esterification in high yields with substantially no by-product contamination is afforded.

SUMMARY OF THE INVENTION

The objective of this invention is accomplished by a novel process, combining a critical combination of catalyst and reaction temperature, for the preparation of organophosphorus acid esters wherein high yields of product are formed with substantially no side reactions and contaminants and whereby stepwise building of the ester is allowed in such a manner that mixed esters are prepared in an easy and economical manner. As an example of the innovative process of this invention, a compound such as chlorophenyl cresyl phenyl phosphate may be conveniently and inexpensively prepared, such preparation being difficult and expensive with known methods now available to the art. Further, mixtures of mono-, di- or tri-chlorophenyl phosphorus esters, mono-, di- or tricresyl phosphorus esters and mono-, di- or tri-phenyl phosphorus esters may all be prepared in the same reaction vessel with substantially no contamination by side reactants and the products may be separated by distillation without undesirable disproportionation.

The novel process of this invention comprises reaction, at specific temperatures, of halides of phosphorus of the formula (I) 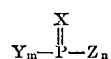

wherein X represents oxygen or sulfur; Y represents R or R'X wherein R represents alkyl, alkenyl, alkynyl, cycloalkyl, cycloalkenyl, cycloalkynyl, heterocyclyl or aryl; R' represents alkyl or aryl; $m$ represents 0 when $n$ is 3, $m$ represents 1 when $n$ is 2 and $m$ represents 2 when $n$ is 1; Z represents chloro or bromo; and $n$ represents 1, 2 or 3, with a compound having the formula (II)     R″XH wherein R″ represents aryl and X represents oxygen or sulfur, in the presence of a urea catalyst.

The reaction sequence involved in the process of this invention proceeds through the following stages, exemplified by the reaction of phenol with phosphoryl chloride:

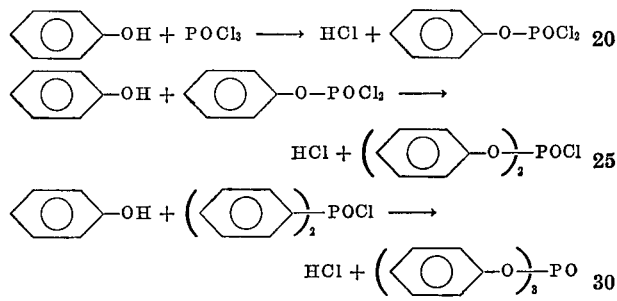

The phosphorus mono- and di-halidates produced are valuable intermediates in the preparation of plasticizers, oil additives and functional fluids and are prepared conveniently by the process of this invention and in high yield with substantially no contamination by side reactions.

The urea catalysts used in the process of this invention may, in general, be any urea which is characterized by the presence of a nitrogen atom capable of entering into a liquid complex with the phosphorus moiety of Formula I under the conditions of the present process. Essentially all urea compounds capable of forming such complex are contemplated as catalysts in this process.

The catalyst concentration which is most effective in the process is a function of many variables, but is generally from about 0.001 to 2.0 mole percent based on the phosphorus halide. Preferably, from 0.01 to 0.1 mole percent is considered a practical level. Of course, greater or lesser amounts may be used effectively within the discretion and experience of those skilled in the art. Thus, the following list of urea compounds is intended merely to illustrate the broad scope of the compounds which are useful as catalysts herein since it would be virtually impossible to specifically list each compound intended.

Representative ureas which may be used as catalysts in the process of this invention include the following compounds, which are illustrative only and are not to be considered a limitation since, as defined above, any urea is suitable providing it is capable of complexing with the phosphorus moiety of Formula I, without restriction on the number of carbon atoms in the urea molecule itself and without restriction as to the substituent groups which may be on either the carbon or nitrogen atoms of the urea. By way of illustration, ureas of the formulas

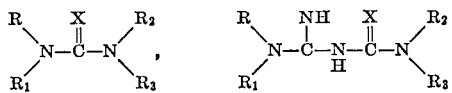

or

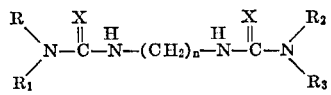

wherein $n=2-6$ include compounds wherein X is oxygen or sulfur and R, $R_1$, $R_2$ and $R_3$ are alkyl, alkenyl, alkynyl, cycloalkyl, cycloalkenyl, cycloalkynyl, aryl, heterocyclyl or combinations and variations thereof whether substituted or nonsubstituted. Further, cyclic urea compounds are contemplated whether substituted or non-substituted. There is virtually no limitation on the number of carbon or nitrogen atoms in the urea compounds or on the number of carbon or other atoms of substituents attached thereto. Accordingly, the only limitation on the size or arrangement of the urea used is that of practicality and expense. The following list of illustrative compounds is therefore to be read in the light of the above teachings.

Aliphatic and alicyclic ureas:
  urea
  biurea
  thiourea
  hydroxyurea
  N-(1-adamantyl) urea
  methylurea
  sym-dimethylurea
  unsym-dimethylurea
  trimethylurea
  tetramethylurea
  ethylurea
  2-nitropropylurea
  tetradecylurea
  sym-dioctadecylurea
  unsym-trieicoxylurea
  1,1-dimethyl-3,3-diethylurea
  sym-ditetracontylurea
  sym-dioctylurea
  unsym-diheptadecylurea
  tetrahexadecylurea
  beta-hydroxyethylurea
  N-acetyl-N-methylurea
  beta-hydroxy-n-propylurea
  dodecylurea
  dipropionylurea
  tetramethylbiuret
  1,3-dichloroamylurea
  dodecylbiuret
  tetraethylbiuret
  thiobiuret
  tetramethylthiobiuret
  octylurea
  sym-dinonadecylurea
  1,3-dinonadecylurea
  1,3-dicyclohexylurea
  unsym-dicyclopentylurea
  sym-dicyclopropylbiuret
  diurea of hexamethylene diamine Aromatic ureas:
  tetrabenzylurea
  sym-dibenzylbiuret
  unsym-dinaphthylurea
  sym-phenanthrylbiuret
  tetranitrophenylurea
  1,3-dichlorophenylurea
  1,3-diphenylthiourea
  sym-dibenzylthiobiuret
  tetraphenylurea
  1,3-ditolylurea
  sym-ditolylthiourea
  S-(p-chlorobenzyl)-thiuronium chloride
  tetraxylylurea
  tetranaphthylthiourea
  1,3-di-biphenylurea
  1,3-diphenanthrylthiourea
  carbanilide Cyclic and heterocyclic ureas:
  cyclobiuret
  ethyleneurea
  cyanuric acid
  ethylenethiourea
  parabanic acid 1-methylhydantoin
urazole
1,3-thienylurea
uracil
1,3-furfurylurea
allantoin
alloxantin
barbituric acid
5,5-dimethylhydantoin
3a,6a-diphenylglycolurel
5,5-diphenyl-2-thiohydantoin
glycouril
hexamethylenehydantoin
5-iododeoxyuridine
orotic acid Ureides:

acetylurea
benzoylurea
cyanacetylurea

Aliphatic olefinic ureas:

vinylurea
1,3-diallylurea

Alicycyclic olefinic ureas:

1,3-cyclohexenylurea

Additional illustrative urea compounds which are contemplated as catalysts in the process of this invention are known to those skilled in the art and are set forth at pages 649–50 of Synthetic Organic Chemistry by Wagner and Zook (Willey and Sons, 1953).

The types of phosphorus halides utilized and prepared in accordance with this invention may be either starting materials or intermediates or end products of the process. For instance, a phosphoryl halide may be a starting material used to prepare a dihalidate phosphorus monoester such as a R′ phosphorodihalidate. The R′ phosphorodihalidate may be an intermediate in the preparation of, for example, a monohalidate phosphorus diester such as a di-$R_2$ phosphorohalidate. The di-R′ phosphorohalidate may be used as an intermediate in the preparation of a phosphorous tri ester end product. At the same time, however, the R′ phosphorodihalidate and di-R′ phosphorohalidate may be considered mono and di-ester end products of the process of this invention. The phosphorus halides utilized are well known to those skilled in the art. Many are commercially available and all are easily prepared in accordance with the process of this invention. The compounds are encompassed by the scope of Formula I and include, by way of illustration, compounds such as:

| Phosphoryl halides | $\overset{O}{\underset{}{\|}}$ $P-Z_3$ |
|---|---|
| Thiophosphoryl halides | $\overset{S}{\underset{}{\|}}$ $P-Z_3$ |
| R′ phosphorodihalidates | $\overset{O}{\underset{}{\|}}$ $R'O-P-Z_2$ |
| O—R′ phosphorodihalidothioates | $\overset{S}{\underset{}{\|}}$ $R'O-P-Z_2$ |
| S-R′ phosphorodihalidothioates | $\overset{O}{\underset{}{\|}}$ $R'S-P-Z_2$ |
| S-R′ phosphorodihalidodithioates | $\overset{S}{\underset{}{\|}}$ $R'S-P-Z_2$ |
| Di-R′ phosphorohalidates | $\overset{O}{\underset{}{\|}}$ $(R'O)_2-P-Z_1$ |
| O,O-Di-R′ phosphorohalidothioates | $\overset{S}{\underset{}{\|}}$ $(R'O)_2-P-Z_1$ |
| O,S-di-R′ phosphorohalidothioates | $\underset{R'S}{\overset{R'O}{\diagdown}}\overset{O}{\underset{}{\|}}P-Z_1$ |
| S,S-di-R′ phosphorohalidodithioates | $\overset{O}{\underset{}{\|}}$ $(R'S)_2-P-Z_1$ |
| O,S-di-R′ phosphorohalidodithioates | $\underset{R'S}{\overset{R'O}{\diagdown}}\overset{S}{\underset{}{\|}}P-Z_1$ |
| S,S-di-R′ phosphorohalidotrithioates | $\overset{S}{\underset{}{\|}}$ $(R'S)_2-P-Z_1$ |
| R-phosphonic dihalides | $\overset{O}{\underset{}{\|}}$ $R-P-Z_2$ |
| R-phosphonothioic dihalides | $\overset{S}{\underset{}{\|}}$ $R-P-Z_2$ |
| Di-R-phosphinic halides | $\overset{O}{\underset{}{\|}}$ $R_2-P-Z_1$ |
| Di-R-phosphinothioic halides | $\overset{S}{\underset{}{\|}}$ $R_2-P-Z_1$ |
| R′R-phosphonohalidates | $R'O-\overset{O}{\underset{R}{\overset{\|}{P}}}-Z_1$ |
| R′ R-phosphonohalidothioates | $R'O-\overset{S}{\underset{R}{\overset{\|}{P}}}-Z_1$ |
| S-R′ R-phosphonohalidothioates | $R'S-\overset{O}{\underset{R}{\overset{\|}{P}}}-Z_1$ |
| S-R′ R-phosphonohalidodithioates | $R'S-\overset{S}{\underset{R}{\overset{\|}{P}}}-Z_1$ |

In the above formulas, R, R′ and Z are defined as in Formula I.

As described in Formula I, R represents alkl, e.g., methyl, ethyl, propyl, butyl, amyl, hexyl, heptyl, octyl, decyl, undecyl, dodecyl, pentadecyl, hexadecyl, octadecyl, nonadecyl and eicosyl, whether straight or branched chain in configuration; cycloalkyl, e.g., cyclopropyl, cyclobutyl, cyclopentyl, ethylcyclopropyl, cyclohexyl, methylcyclopentyl, methylcyclohexyl, decahydronaphthyl, bicyclohexyl (cyclohexylcyclohexyl), tetradecahydrophenanthryl, tricyclohexylmethyl; alkenyl, e.g., ethenyl, propenyl, butenyl, isobutenyl, pentenyl, methylbutenyl, trimethylethenyl, hexenyl, heptenyl, octenyl, nonenyl, decenyl, dodecenyl, tridecenyl, hexadecenyl, octadecenyl, eiscosenyl; cycloalkenyl, e.g., cyclopropenyl, cyclopentenyl, cyclohexenyl, cyclohexylcyclohexenyl; alkynyl, e.g., ethynyl, propynyl, butynyl, pentynyl, hexynyl, heptynyl, octynyl, nonynyl, decynyl, tridecynyl, octadecynyl, eicosynyl; cycloalkynyl, e.g., 1-cycloden-4-yl; heterocyclic radicals containing oxygen or sulfur in the heteroyclic ring, e.g., thiophenyl, furanyl, tetrahydrofuranyl, pyranyl, sulfolanyl; aryl, e.g., phenyl, naphthyl, biphenyl, phenanthryl, anthracyl, terphenyl or quaterphenyl; and R′ represents alkyl or aryl, as described above with reference to R.

R and R′ may be unsubstituted, as described above, or substituted. It is to be understood that the urea catalysts of this invention will catalyze the preparation of organophosphorus esters in accordance with this invention regardless of the type or extent of substitution of the radicals defined as included within R and R′ above. Thus the radicals represented by R and R′ may be substituted with any organic moiety except a carboxyl group or a hydroxyl group which may interfere with the reaction.

The following radicals are illustrative of the substituents which may occur on the groups represented by R and R' of the phosphorus halides and R, $R_1$, $R_2$ and $R_3$ of the urea catalysts: alkyl, cycloalkyl, alkenyl, cycloalkenyl, alkynyl, cycloalkynyl, and aryl as described above. Also, halo, e.g., chloro, bromo, fluoro, iodo; alkoxy, e.g., methoxy, propoxy, butoxy, hexoxy, decoxy; cycloalkoxy, e.g., cyclohexoxy, cyclobutoxy; alkenoxy, e.g., propenoxy; cycloalkenoxy, e.g., cyclopentenoxy; aryloxy, e.g., phenoxy, naphthoxy; cyano; nitro; isonitro; aldehyde; ketone; e.g., phenoxycarbonyl; alkylcarbonyloxy, e.g., acetyl; alkoxycarbonyloxy, e.g., acetoxy; arylcarbonyloxy, e.g., benzoyl; alkylthio, e.g., ethylthio; arylthio, e.g. phenylthio, naphthylthio, trihaloalkyl, e.g., trifluoromethyl; alkylsulfinyl; e.g., butylsulfinyl; arylsulfinyl, e.g., phenylsulfinyl; alkylsulfonyl, e.g., propylsulfonyl; arylsulfonyl, e.g., phenylsulfonyl.

Specific phosphorus halides which are encompassed within the scope of this invention include phosphoryl chloride, phosphoryl bromide, phosphoryl dibromide chloride, thiophosphoryl chloride and bromide, phenyl phosphorodichloridate, p-chlorophenyl phosphorodibromidate, p-nitrophenyl phosphorodichloridate, p-nitrophenyl phosphorodichloridothioate, cresyl phosphorodichloridate, o-methoxyphenyl phosphorodichloridate, nonylphenyl phosphorodichloridate, cumylphenyl phosphorodichloridate, o-biphenyl phosphorodichloridate, naphthyl phosphorodichloridate, isopropylphenyl phosphorodichloridate, tert-butylphenyl phosphorodichloridate, isodecyl phosphorodichloridate, S-phenyl phosphorodichloridothioate, S-p-nitrophenyl phosphorodichloridothioate, S-phenyl phosphorodichloridodithioate, diphenyl phosphorochloridate, dicresyl phosphorochloridate, dibutyl phosphorodichloridate, dihexyl phosphorodichloridate, dioctyl phosphorodichloridate, didecyl phosphorodichloridate, O,O-diphenyl phosphorochloridothioate, O,O - dimethyl phosphorochloridothioate, O,O-diethyl phosphorochloridothioate, S,S - diphenyl phosphorobromidodithioate, S,S - diphenyl phosphorochloridotrithioate, phenylphosphonic dichloride, p - chlorophenylphosphonic dibromide, methylphosphonic dichloride, chloromethylphosphonic dichloride, phenylphosphonothioic dichloride, cresylphosphonothioic dibromide, methylphosphonothioic dichloride, chloromethylphosphonothioic dichloride, diphenylphosphinic chloride, diphenylphosphonic bromide, dimethylphosphonic chloride, diethylphosphinic bromide, diphenylphosphinothioic chloride, dimethylphosphinothioic chloride, ethylmethylphosphinothioic bromide, phenyl phenylphosphonochloridate, p - nitrophenyl phenylphosphonochloridate, cresyl phenylphosphonochloridate, O - phenyl phenylphosphonochloridothioate, O-ethyl phenylphosphonochloridothioate, S - phenyl phenylphosphonobromidothioate, S-phenyl phenylphosphonochloridodithioate.

The alcohols and thioalcohols embraced by the scope of Formula II include those compounds wherein R' represents aryl groups as defined with respect to R and R' of the phosphorus halides, Thus, R'' represents phenyl, alkylphenyl, halophenyl, arylphenyl, cycloalkylphenyl, naphthyl, biphenyl, phenanthryl, anthracyl, terphenyl, quaterphenyl, whether substituted or nonsubstituted.

Specific alcohols of the formula R''XH which will illustrate the types of compounds utilized include phenol, o, m, p-cresol, o-ethylphenol, o, m, p-isopropylphenol, p-tert-butylphenol, p-tert-amylphenol, nonylphenol, 2,4-xylenol, 2,6-xylenol, 2,5-xylenol, 2,3-xylenol, o, m, p-chlorophenol, p-bromophenol, p-iodophenol, 2,4-dichlorophenol, 2,4,5 - trichlorophenol, pentachlorophenol, o-phenylphenol, p-cumylphenol, o-cyclohexylphenol, alpha-naphthol, beta-naphthol, o-methoxyphenol, p-ethoxyphenol, o-phenoxyphenol, p-nitrophenol, n-trifluoromethylphenol, 2-allylphenol, 2-benzylphenol, vanillin, 4-chloro - 3,5 - dimethylphenol, 4 - chloro - 1 - naphthol, 2 - chloro - 4 - nitrophenol, 4 - cyanophenol, 2,4-di-tert-butylphenol, 2,4-dimethoxyphenol, methylsalicylate, 2-fluorophenol, p-hydroxyacetophenone, 4 - hydroxybenzaldehyde, thiophenol, p-chlorothiophenol, p-tert-butylthiophenol, thiocresol, thioxylenol, phenylthiophenol, thionaphthol, allylthiophenol.

The compounds of Formulas I and II, described above, are generally known in the art and their methods of preparation are available in standard texts and reference sources.

A preferred class of the compounds of Formula I are those compounds of the formula

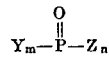

wherein Y=R or R'O wherein R'=aryl or substituted aryl and R, Z, m and n are defined in Formula I. Representative of this preferred class of compounds are phosphoryl chloride, phosphoryl bromide, phenyl phosphorodichloridate, p-chlorophenyl phosphorodibromidate, p-nitrophenyl phosphorodichloridate, cresyl phosphorodichloridate, o-methoxyphenylphosphorodichloridate, nonylphenyl phosphorodichloridate, cumylphenyl phosphorodichloridate, o - biphenyl phosphorodichloridate, naphthyl phosphorodichloridate, isopropylphenyl phosphorodichloridate, tert-butylphenyl phosphorodichloridate, diphenyl phosphorochloridate, dicresyl phosphorochloridate, phenylphosphonic dichloride, p-chlorophenylphosphonic dichloride, methylphosphonic dibromide, chloromethylphosphonic dichloride, diphenylphosphinic chloride, diphenylphosphonic bromide, dimethylphosphinic chloride, diethylphosphinic bromide, phenyl phenylphosphonochloridate, p-nitrophenyl phenylphosphonochloridate, cresyl phenylphosphonochloridate.

A preferred class of the compounds of Formula II are those compounds of the formula R''OH. Representative of this preferred class of compounds are phenol, o, m, p-cresol, o-ethylphenol, o, m, p-isopropylphenol, p-tert-butylphenol, p-tert-amylphenol, nonylphenol, xylenol, o, m, p-chlorophenol, p-bromophenol, p-iodophenol, dichlorophenol, trichlorophenol, pentachlorophenol, p-cumylphenol, o-cyclohexylphenol, naphthol, methoxyphenol, ethoxyphenol, phenoxyphenol, p-nitrophenol, trifluoromethylphenol, allylphenol, benzylphenol, vanillin, 4-chloro - 3,5 - dimethylphenol, 4 - chloro-1-naphthol, 2-chloro - 4 - nitrophenol, cyanophenol, di-tert-butylphenol, dimethoxyphenol, methylsalicylate, fluorophenol. Especially preferred of this group are phenol, cresol, cumylphenol, nonylphenol, xylenol, chlorophenol, tert-butylphenol, phenylphenol, isopropylphenol and mixtures thereof.

A specialized class of alcohol which are utilized in accordance with this invention are alcohols of the formula (III)          HO—R'''—OH wherein R''' represents isopropylidenediphenylene, e.g.,

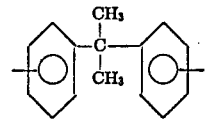

or phenylene, e.g.,

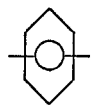

Representative of this special class of alcohols are isopropylidenediphenol, hydroquinone, catechol and resorcinol.

In accordance with the novel process of this invention, the reaction between the phosphorus halides and alcohols to prepare organophosphorus esters proceeds in three stages. Use of the catalysts of this invention, in conjunction with specific temperatures, produces the desired results of this invention. Thus, in the presence of the urea catalysts of this invention, the first chlorine of, example, phosphoryl chloride is placed at a temperature of from about 85 to about 135° C., preferably 105° C. The second chlorine, i.e., disubstitution, is replaced at a temperature of from about 130 to about 165° C., preferably 150° C. The third chlorine, i.e., trisubstitution, is replaced at a temperature of from about 160 to about 250° C., preferably 200° C. Of course, the specific temperatures for mono-, di- and trisubstitution will vary with the particular phosphorus halide being used, but the comparative differences in the temperatures for the stages of substitution will remain approximately the same.

Accordingly, the combination of specific temperatures for mono-, di- and tri-substitution of the desired phosphorus halides, together with the catalysts of this invention, enable those skilled in the art to prepare mono-, di- or tri-organophosphorus esters in selected proportions. Triorganophosphorus esters may be prepared in three stages, with a different alcohol being added to the phosphorus halide reactant at each stage. Similarly, mixtures of esters may be prepared in one reactor. For example, by adding a naphthyl group at the first stage, a chlorophenyl group at the second stage and a phenyl group at the third stage, one may use the same phosphorus halide but merely introduce different appropriate alcohols at the temperature stages set forth above to obtain naphthyl chlorophenyl phenyl phosphate as well as naphthyl phosphorochloridate and naphthyl chlorophenyl phosphorochloridate. The different compounds may then be recovered separately by methods known in the art. Further, selected proportions of various compounds may be prepared in the same reactor. Thus, if one desired a mixture of naphthyl phosphorodichloridate, naphthyl chlorophenyl phosphorochloridate and naphthyl phenyl phosphorochloridate in proportions of 2:3:1, such selective proportions of the desired products can be made in accordance with the present invention by adding the intended proportion of each appropriate alcohol in the separate stages.

The following examples will serve to illustrate specific embodiments of the concept of this invention but are not to be regarded as restrictive of the scope thereof since it has been found that the catalysts of this invention promote the reaction betwen virtually any phosphorus halide and any alcohol under the conditions defined herein.

EXAMPLE 1

To a mixture of 225 g. phosphoryl chloride and 1.6 g. 1,1,3,3-tetramethylurea there is added 94 g. phenol over a two hour period at a temperature of 100–105° C. The temperature is held at 105° C. for two hours, cooled and stripped of hydrogen chloride and other low boilers. Distillation affords 93.7 percent (194.9 g.) phenyl phosphorodichloridate, 4.4 percent (7.0 g.) diphenyl phosphorochloridate and 1.1 percent (2.3 g.) triphenyl phosphate.

EXAMPLE 2

To a mixture of 225 g. phosphoryl chloride and 2 g. urea there is added 94 g. phenol over a one-hour period at a temperature of 100–105° C. The temperature is then raised to 105–110° C. and held for two hours, stripped and allowed to cool to room temperature. Distillation affords predominantly phenyl phosphorodichloridate.

EXAMPLE 3

To a mixture of 225 g. phosphoryl chloride and 1.6 g. 1,3-diphenylurea there is added 94 g. phenol over a period of one hour at a temperature of 100–105° C. The temperature is then raised to 105–110° C. and held for two hours, stripped and cooled. Distillation affords 65.1 percent (105.5 g.) phenyl phosphorodichloridate, 8.3 percent (13.4 g.) diphenyl phosphorodichloridate and 1.5 percent (2.4 g.) triphenyl phosphate.

EXAMPLE 4

To a reaction vessel there is added 0.3 mole methyldichlorophosphine sulfide and 0.05 mole ethyleneurea. Over a period of one-half hour, a total of 0.3 mole phenol is added at a pot temperature of 120–125° C. The temperature is held at 125–130° C. for two hours and then allowed to gradually cool to room temperature. There is obtained predominantly O - phenyl methylphosphonochloridothioate.

EXAMPLE 5

To a mixture of 0.3 mole thiophosphoryl chloride and 0.004 mole tetra methylurea there is added 0.3 mole phenol over a two-hour period at 120° C. The temperature is then raised to 125° C. and held for one hour., The reaction mixture is stripped, affording predominantly phenyl thiophosphorodichloridate.

EXAMPLE 6

To a reaction vessel there is added 0.3 mole phenyl phosphorodichloridate and 0.05 mole difurfurylurea. Over a period of approximately one-half hour, 0.3 mole phenol is added at a temperature of 150° C. and the pot temperature is then held at 145–150° C. for one hour and the mixture is allowed to cool to room temperature. Distillation affords 86 percent diphenyl phosphorochloridate and 9 percent triphenyl phosphate.

EXAMPLE 7

To a mixture of 0.3 mole chloromethylphosphonicdichloride and 0.05 mole dodecylurea there is added 0.3 mole phenol over a one-half hour period at a temperature of 150° C. The temperature is held at 150° C. for one hour and the mixture is brought to room temperature. Distillation affords phenyl chloromethanephosphonochloridate.

The following table illustrates further examples of the reaction of a phosphorus halide and an alcohol or thioalcohol in the presence of urea catalyst:

TABLE

| Example | Phosphorus halide | Alcohol | Catalyst |
|---|---|---|---|
| 8 | Phosphoryl bromide | o, m, p-Cresol | Urea. |
| 9 | Thiophosphoryl chloride | o-Ethylphenyl | 1,3-ditetracontylurea. |
| 10 | Phenyl phosphorodichloridate | Xylenol | 1,3-dioctadecylbiuret. |
| 11 | o-Methoxyphenyl phosphorodichloridate | Nonylphenol | Tetramethylthiourea. |
| 12 | S-phenyl phosphorodichloridothioate | o, m, p-Cresol | Tetraundecylurea. |
| 13 | Dicresyl phosphorochloridate | Trichlorophenol | 1,3.dibutylurea. |
| 14 | O, O-diphenyl phosphorochloridothioate | p-Iodophenol | 1,3-ditriacontylthiourea. |
| 15 | S,S-diphenyl phosphorochloridotrithioate | o-Cyclohexyl phenol | 1,3-diphenylurea. |
| 16 | Phenylphosphonic dichloride | Thiophenol | Benzylurea. |
| 17 | Chloromethylphosphonic dibromide | o-Methoxyphenol | 1,3-dicyclohexylurea. |
| 18 | Phenylphosphonothioic dichloride | Phenoxyphenol | Tetrabenzylthiourea. |
| 19 | Diphenylphosphinic chloride | Cyanophenol | 1,3-biphenylurea. |
| 20 | Diethylphosphinothioic bromide | Methyl salicylate | 1,3-ditolylurea. |
| 21 | Phenyl phenylphosphonochloridate | 4,4'-isopropylidene diphenol | 1,3-thienylurea. |
| 22 | S-phenyl phenylphosphonobromidothioate | Resorcinol | Octylurea. |
| 23 | O-phenyl phenylphosphorodichloridate | Hydroquinone | Cyclohexenylurea. |
| 24 | S-phenyl phenylphosphorodichloridothioate | Catechol | Tetradecenylurea. |
| 25 | p-Chlorophenyl phosphorodibromidate | p-Cumylphenol | Propynylurea. |
| 26 | Cresyl phosphorodichloridate | p-tert-Amylphenol | 1,3-dinaphthylurea. |
| 27 | Nonylphenyl phosphorodichloridate | Pentachlorophenol | Hexylbiuret. |
| 28 | Cumylphenyl phosphorodibromidate | Phenoxyphenol | 1,3-Dodecylurea. |
| 29 | Naphthyl phosphorodichloridate | p-Bromophenol | 1,3-Hexylbiuret. |
| 30 | Diphenyl phosphorochloridate | Naphthol | 1,3-cyclopropylurea. |
| 31 | Di-2-ethylhexyl phosphorochloridate | Fluorophenol | 1,3-diallylurea. |
| 32 | Phenylphosphonic dichloride | Nitrophenol | 1,3-cyclobutylurea. |
| 33 | Cumyl phosphorodichloridate | Nonylphenol | 1,3-dipropionylbiuret. |
| 34 | Phenyl phosphorodichloridate | Phenol | 1,3-acetylthiourea. |

EXAMPLE 35

To a mixture of 0.01 mole urea and one mole of cresol there is added one mole of phosphoryl chloride over a period of one hour at a temperature of 125–140° C. and the reaction mixture is stripped and allowed to cool. Distillation affords cresyl phosphorodichloridate in 99.6% yield.

EXAMPLE 36

(1) To a mixture of 225 g. phosphoryl chloride and 1.6 g. tetramethylurea there is added 109 g. cresol over a period of two hours at a temperature of 105° C. The temperature is held at 105–110° C. for two hours to afford cresyl phosphorodichloridate.

(2) The temperature of the reaction mixture obtained in (1) is raised to 135° C. and 109 g. cresol is fed into the reactor over a two hour period. The temperature is held at 150° C. for an additional one and one-half hours to afford dicresyl phosphorochloridate.

(3) The temperature of the reaction mixture obtained in (2) is raised to 200° C. and 109 g. cresol is fed into the reactor during two hours. The temperature is maintained at 200–210° C. for two hours to afford tricresyl phosphate.

EXAMPLE 37

(1) To a mixture of 225 g. phosphoryl chloride and 2 g. urea there is added 94 g. phenol over a two-hour period at a temperature of 105–110° C. The temperature is held for two hours at 110–115° C. to afford phenyl phosphorodichloridate.

(2) The temperature of the reaction mixture of (1) is raised to 135° C. and 109 g. cresol is fed into the reactor during two hours. The temperature is held at 150° C. for an additional two hours to afford cresyl phenyl phosphorochloridate.

(3) The temperature of the reaction mixture of (2) is raised to 200° C. and 122 g. xylenol is added during two hours. The temperature is maintained at 220° C. for one and one-half hours and the reaction mixture is vacuum treated and allowed to cool to room temperature. Distillation affords cresyl phenyl xylyl phosphate.

EXAMPLE 38

To a mixture of 225 g. phosphoryl chloride and 1.6 g. diphenylurea there is added 94 g. phenol during two hours at a temperature of 105° C. The temperature is then raised to 150° C. while gradually adding an additional 94 g. phenol and the temperature is finally raised to 180° C. while gradually adding a final portion of 94 g. phenol. The temperature is held at 200° C. for two hours, stripped and allowed to cool. Distillation affords triphenyl phosphate.

EXAMPLE 39

A mixture of 282 g. phenol, 153.4 g. phosphoryl chloride and 1.6 g. urea is heated to 200° C. over four to six hours. The temperature is then maintained at 200° C. under vacuum for two hours. Distillation affords triphenyl phosphate.

EXAMPLE 40

(1) To a mixture of 920 g. phosphoryl chloride and urea there is added a mixture of 614 g. cumylphenol and 794 g. nonylphenol during two hours at a temperature of 105–110° C. to afford a mixture of cumylphenylphosphorodichloridate and nonylphenylphosphorodichloridate.

(2) The temperature of the reaction mixture obtained in (1) is raised to 135° C. and 564 g. phenol is added over a two hour period. The temperature is held at 150° C. for an additional one and one-half hours to afford a mixture of cumylphenyl phenyl phosphorochloridate and nonylphenyl phenyl phosphorochloridate.

(3) The temperature of the reaction mixture obtained in (2) is raised to 200° C. and 564 g. phenol is added over two hours. The temperature is maintained at 200°–210° C. for two hours to afford a mixture of cumylphenyl diphenyl phosphate and nonylphenyl diphenyl phosphate.

EXAMPLE 41

(1) To a mixture of 225 g. phosphoryl chloride and urea there is added 109 g. cresol over a period of two hours at a temperature of 105° C. The temperature is held at 105° C.–110° C. for two hours to afford cresyl phosphorodichloridate.

(2) The temperature of the reaction mixture obtained in (1) is raised to 135° C. and 94 g. phenol is added during two hours at a temperature of 150° C. and held for an additional two hours to afford cresyl phenyl phosphorochloridate.

(3) The temperature of the reaction mixture obtained in (2) is raised to 200° C. and an additional 94 g. phenol is added during two hours. The temperature is held at 200–210° C. for an additional two hours to afford cresyl diphenyl phosphate.

The embodiments of the invention in which an inclusive property or privilege is claimed are defined as follows:

1. The process of preparing organophosphorus esters according to claim 1 which comprises reacting a phosphorus halide of the formula

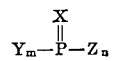

wherein

X represents oxygen or sulfur;
Y represents R or R'X;
R represents alkyl, alkenyl, alkynyl, cycloalkyl, cycloalkenyl, cycloalkynyl, heterocyclyl or aryl;
R' represents alkyl or aryl;
$m$ represents 0 when $n=3$, 1 when $n=2$ and 2 when $n=1$;
$n$ represents 1, 2 or 3; and
Z represents chloro or bromo
with a compound of the formula

wherein

R" represents aryl; and
X represents oxygen or sulfur at a temperature of up to about 250° C. in the presence of a catalytic amount of a urea containing a nitrogen atom which forms a complex with the phosphorus moiety of said phosphorus halide.

2. The process of claim 1 wherein R" is selected from the group consisting of phenyl, cresyl, cumylphenyl nonylphenyl, xylyl, tert-butylphenyl, phenylyl, isopropylphenyl, chlorophenyl and mixtures thereof.

3. A process for preparing an organophosphorusdihalidate which comprises reacting a phosphorus halide according to claim 2 with an approximately equimolar amount of a compound of the formula R"XH according to claim 1 at a temperature of about 135° C. in the presence of a catalytic amount of a urea containing a nitrogen atom which forms a complex with the phosphorus moiety of said phosphorus halide.

4. The process of claim 3 wherein R" is selected from phenyl, cresyl, cumylphenyl nonylphenyl, xylyl, tert-butylphenyl, phenylyl, isopropylphenyl, chlorophenyl and mixtures thereof.

5. The process of claim 3 wherein said organophosphorus diahalidate is selected from phenyl phosphorochloridate, phenylyl phosphorochloridate, cresyl phosphorochloridate, tert - butylphenyl phosphorochloridate, cumylphenyl phosphorochloridate, nonylphenyl phosphorochloridate, xylyl phosphorochloridate, isopropylphenyl phosphorochloridate, chlorophenyl phosphorochloridate and mixtures thereof.

6. A process for preparing a diorganophosphorushalidate which comprises reacting an organophosphorusdihalidate with an approximately equimolar amount of a compound of the formula R"XH according to claim 1 at a temperature of about 165° C. in the presence of a catalytic amount of urea containing a nitrogen atom which forms a complex with the phosphorus moiety of said organophosphorusdihalidate.

7. The process of claim 6 wherein said diorganophosphorushalidate is selected from nonylphenyl phenyl phosphorochloridate and cumylphenyl phenyl phosphorochloridate and mixtures thereof.

8. A process for preparing organophosphorus esters which comprises reacting, in the presence of a catalytic amount of a urea containing a nitrogen atom which forms a complex with a phosphorus moiety, (1) a phosphorus halide of claim 1 with an approximately equimolar amount of a first compound of a formula of R"XH of claim 1 at a temperature of about 85–135° C. to form an organophosphorusdihalidate, (2) adding an approximately equimolar amount of a second compound of formula R"XH to the reaction product of (1) at a temperature of about 130–165° C. to form a diorganophosphorushalidate and (3) adding an approximately equimolar amount of a third compound of formula R"XH to the reaction product of (2) at a temperature of about 160–250° C.

9. The process of claim 8 wherein said compound of formula R"XH is selected from phenol, cresol, cumylphenol, nonylphenol, xylenol, tert-butylphenol, phenylphenol, isopropylphenol, chlorophenol and mixtures thereof.

10. The process of preparing organophosphorus esters according to claim 2 which comprises reacting a phosphorus halide of the formula

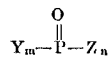

wherein

Y represents R or R'O;
R represents alkyl, alkenyl, alkynyl, cycloalkyl, cycloalkenyl, cycloalkynyl, heterocyclyl or aryl;
R' represents aryl;
$m$ represents 0 when $n=3$, 1 when $n=2$ and 2 when $n=1$;
$n$ represents 1, 2 or 3; and
Z represents chloro or bromo with an approximately $n$ molar amount of a compound of the formula

R"XH wherein

R" represents aryl; and
X represents oxygen or sulfur at a temperature of up to about 250° C. in the presence of a catalytic amount of a urea which forms a complex with a phosphorus moiety.

11. The process of preparing organophosphorus esters according to claim 2 which comprises reacting a phosphorus halide of the formula

wherein

Y represents R or R'O;
R represents alkyl, alkenyl, alkynyl, cycloalkyl, cycloalkenyl, cycloalkynyl, heterocyclyl or aryl;
R' represents aryl;

$m$ represents 0 when $n=3$, 1 when $n=2$ and 2 when $n=1$;
$n$ represents 1, 2 or 3; and
Z represents chloro or bromo with an approximately $n$ molar amount of a compound of the formula

R"OH wherein

R" represent aryl at a temperature of up to 250° C. in the presence of a catalytic amount of a urea capable of complexing with a phosphorus moiety.

12. The process of claim 11 wherein R" is selected from phenyl, cresyl, cumylphenyl, nonylphenyl, xylyl, tert-butylphenyl, phenylyl, isopropylphenyl, chlorophenyl and mixtures thereof.

13. The process of claim 11 wherein said urea is selected from urea, tetramethylurea, diphenylurea, dodecylurea or dipyrrolineurea.

14. The process of preparing organophosphorus esters according to claim 2 which comprises reacting a phosporus halide of the formula

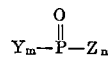

wherein

Y represents R or R'O;
R represents alkyl, alkenyl, alkynyl, cycloalkyl, cycloalkenyl, cycloalkynyl, heterocyclyl or aryl;
R' represents aryl;
$m$ represents 0 when $n=3$, 1 when $n=2$ and 2 when $n=1$;
$n$ represents 1, 2 or 3; and
Z represents chloro or bromo with an approximately $n$ molar amount of a compound of the formula

HO—R'''—OH wherein

R''' represents isopropylidenediphenylene or phenylene at a temperature of up to about 250° C. in the presence of a catalytic amount of a urea which forms a complex with a phosphorus moiety.

15. The process of preparing an organophosphorus ester according to claim 11 which comprises reacting phosphoryl chloride with an approximately trimolar amount of phenol at a temperature of up to about 250° C. in the presence of a urea catalyst which forms a complex with a phosphorus moiety.

16. The process of claim 11 wherein said organophosphorus ester is selected from triphenyl phosphate, tricresyl phosphate, cumylphenyl diphenyl phosphate, cresyl diphenyl phosphate, nonylphenyl diphenyl phosphate and mixtures thereof.

References Cited
UNITED STATES PATENTS
1,785,951   12/1930   Gibson et al. _____ 260—975

ANTON H. SUTTO, Primary Examiner

U.S. Cl. X.R.
260—345.7, 347.3, 553 R, 553 A, 553 B, 564 A, 564 F, 930, 975

UNITED STATES PATENT OFFICE
CERTIFICATE OF CORRECTION

Patent No. 3,772,414      Dated November 13, 1973

Inventor(s) Joseph W. Baker and Ignatius Schumacher

It is certified that error appears in the above-identified patent and that said Letters Patent are hereby corrected as shown below:

Column 5, line 33, "Willey" should read -- Wiley --.

Column 8, line 48, "alcohol" should read -- alcohols --.

Column 12, line 24 (Claim 1), "according to claim 1" should be deleted.

Column 12, line 66 (Claim 5), "diahalidate" should read -- dihalidate --.

Column 13, line 3 (Claim 6), after "of" insert -- a --.

Column 14, line 10 (Claim 11), "represent" should read -- represents --.

Column 14, line 12 (Claim 11), delete "capable of complexing" and insert therefor -- which forms a complex --.

Signed and sealed this 30th day of April 1974.

(SEAL)
Attest:

EDWARD M. FLETCHER, JR.
Attesting Officer

C. MARSHALL DANN
Commissioner of Patents